United States Patent [19]
Hofer

[11] Patent Number: 6,022,177
[45] Date of Patent: Feb. 8, 2000

[54] SPACER SCREW

[75] Inventor: David Hofer, Laufelfingen, Switzerland

[73] Assignee: Meyer Liestal AG, Liestal, Switzerland

[21] Appl. No.: 09/196,835

[22] Filed: Nov. 20, 1998

[30] Foreign Application Priority Data

Nov. 20, 1997 [CH] Switzerland .............................. 2688/97

[51] Int. Cl.⁷ .............................. F16B 35/04; F16B 35/06
[52] U.S. Cl. .............................. 411/412; 411/399; 411/418
[58] Field of Search ...................................... 411/399, 386, 411/412, 413, 418, 420, 421

[56] References Cited

U.S. PATENT DOCUMENTS

| | | | |
|---|---|---|---|
| 1,238,636 | 8/1917 | Christofferson | 411/399 |
| 1,465,148 | 8/1923 | Rosenberg | 411/418 |
| 4,815,909 | 3/1989 | Simons | 411/421 X |
| 4,900,208 | 2/1990 | Kaiser . | |
| 5,746,039 | 5/1998 | Nystrom | 411/412 X |

FOREIGN PATENT DOCUMENTS

| | | | |
|---|---|---|---|
| 2713291 | 6/1995 | France . | |
| 9726460 | 7/1997 | WIPO . | |

OTHER PUBLICATIONS

International Search Report # 2688/97 daed Nov. 20, 1997.

*Primary Examiner*—Neill Wilson
*Attorney, Agent, or Firm*—Brown & Wood LLP

[57] ABSTRACT

The spacer screw has a thread section which can be inserted into a base member, a head section which can be introduced into a structural member and has a thread, and a shank section arranged in between. According to the invention, the thread is provided with a series of slits which in turn is formed from recesses running transversely to the screw axis and interrupting the thread turn at constant distances. When the screw is used, the thread is screwed into the structural member, which, in contrast to the use of known screws, is effected without excessive force. In addition, this screwing-in process takes place independently of the screwing of the thread section into the base member. When the thread section is screwed into the base member and when the head section is screwed into the structural member, the slit-like recesses do in fact generate a draw-in resistance, the draw-through force of the thread of the head section being reduced by the magnitude of said draw-in resistance. Because of this and because the screw head has a diameter d which is at least equal to the external diameter of the thread, when the screw head is sunk completely in the structural member the distance between the structural member and the base member can be reduced on screwing in and can be increased in an analogous manner on unscrewing.

9 Claims, 2 Drawing Sheets

Fig. 1
Fig. 2
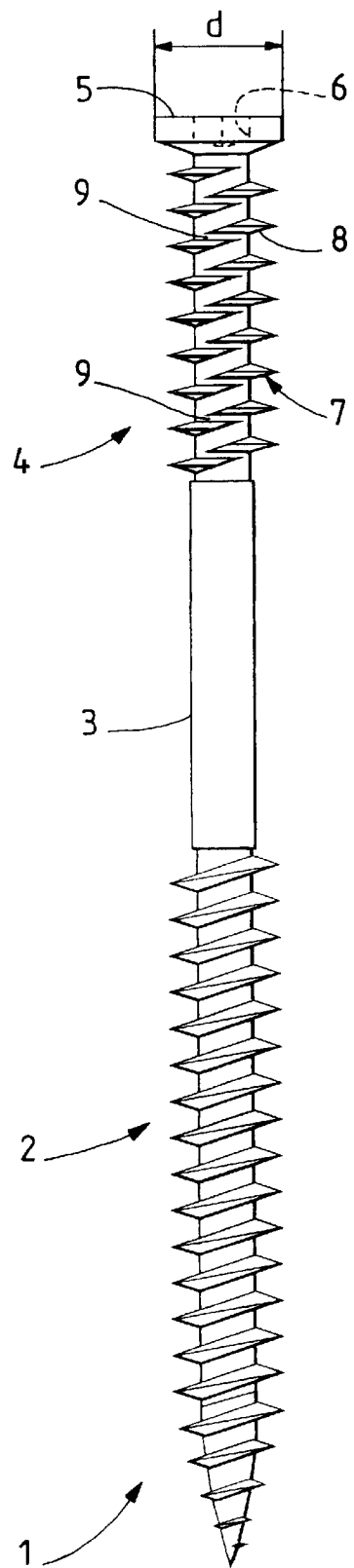
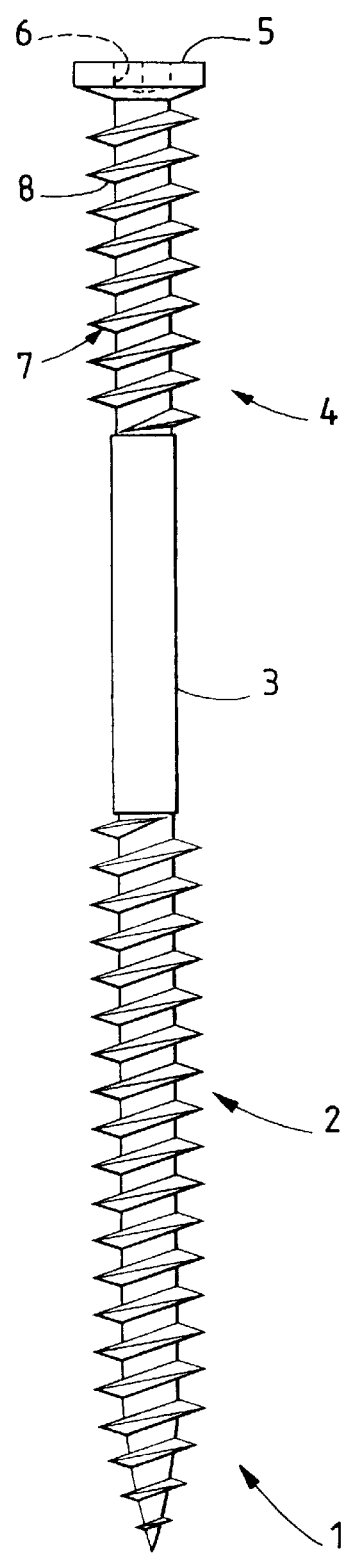

SPACER SCREW

BACKGROUND OF THE INVENTION

1. Field of the Invention

The invention relates to a spacer screw, by means of which a structural member, such as, for example, a beam or a wall part, can be fixed to a base member at a variable distance.

There are spacer screws which have a thread section on their front end capable of penetrating into the base member, an anchoring section present at the opposite rear end and consisting of a plurality of annular ribs widening toward the screw head, and a threadless shank section in between. Such screws are disclosed, for example, in U.S. Pat. No. 4,808,051 and have the disadvantage that they are only of limited use. Thus, in this special case, the force to be applied when screwing the thread section into the base member must be so great that at the same time the anchoring section is driven into the structural member, which not only may result in undesired cracking and splitting but also requires the use of structural members which have lower strength than the base member.

2. Description of the Prior Art

To overcome these disadvantages, further spacer screws have been disclosed in the meantime.

Thus, a second spacer screw is disclosed in the International Laid-Open Application 97/26460. A screw disclosed in this prior publication has a thread section which can be screwed into the base member, opposite this a head section having a plurality of circumferential ribs facing the rear end and a thread following on therefrom, and a shank region which in turn is arranged between the thread section which can be screwed into the base member and the thread of the head section. An essential feature of this screw is that the head section has a larger core diameter than the front thread section which can be screwed into the base member.

Furthermore, triangular notches are provided in the circumferential ribs and in the thread turns of the head section. Said notches form cutting edges which, on the one hand, facilitate the screwing of the associated thread into the structural member and, on the other hand, prevent the anchoring section from coming out of the structural member during correction of the spacing.

Although this screw has some advantages compared with the spacer screw described above, it is expensive to produce owing to its design with two different core diameters and is therefore scarcely suitable for efficient use on the building site.

Finally, a third spacer screw is disclosed in European Laid-Open Application 0 801 233. The countersunk screw disclosed therein is formed essentially in the same way as the screw disclosed in WO/97/26460, i.e. has a thread section which can be screwed into the base member, a head section with at least two circumferential ribs and a thread following on therefrom, and a shank region arranged in between.

The essential feature of this third spacer screw is that the thread of the head section has a larger external diameter than the thread section in the point region.

It is known that both the screw of WO/97/26460 and that of EP-A 0 801 233 cannot always be driven easily, i.e. with as little force as possible, into the structural member to be fastened. In addition, these two spacer screws also have the further disadvantage that, when they are used, a desired distance between base member and structural member can be established only when the thread of the head section is screwed virtually completely out of the structural member, and that therefore, in the case of structural members with relatively large wall thicknesses, the screw head must be screwed far into the structural member, which has an adverse effect on the stability properties of the fastened members.

SUMMARY OF THE INVENTION

Starting from the prior art disclosed in WO/97/26460 and that disclosed in EP-A 0 801 233, it is the object of the invention to provide a spacer screw which does not have the above-mentioned disadvantages but nevertheless permits optimum adjustment of the desired distance between structural member and base member.

This object is achieved by a spacer screw which has a thread section which can be screwed into a base member and a head section which can be introduced into a structural member and has a screw head at the end and an anchoring section having a thread, wherein the anchoring section has no circumferential ribs permitting anchoring of the head section in the structural member and consists only of said thread, and wherein this thread is provided with a plurality of slit-like recesses interrupting the thread turn, and the external diameter of the screw head is at least equal to the external diameter of the thread.

It should also be mentioned at this point that French Laid-Open Application 2,713,291 and U.S. Pat. No. 4,900,208 disclose fastening means which have the feature stated in the defining part of claim 1, i.e. that the thread of the anchoring section is provided with a plurality of slit-like recesses. However, these fastening means are not spacer screws of the type described here but rather serve for fastening insulation panels and the like directly to a support, such as, for example, to a roof panel. The fastening means of FR-A 2,713,291 and U.S. Pat. No. 4,900,208 have another technical function. They therefore neither anticipate nor suggest the spacer screw which is the subject of the present invention.

BRIEF DESCRIPTION OF THE DRAWINGS

The invention is described below in more detail with reference to the drawings. In the drawings, FIG. 1 shows a view of a preferred embodiment of the spacer screw according to the invention, FIG. 2 shows the back of the spacer screw shown in FIG. 1.

DETAILED DESCRIPTION OF THE PREFERRED EMBODIMENTS

Figure 3:
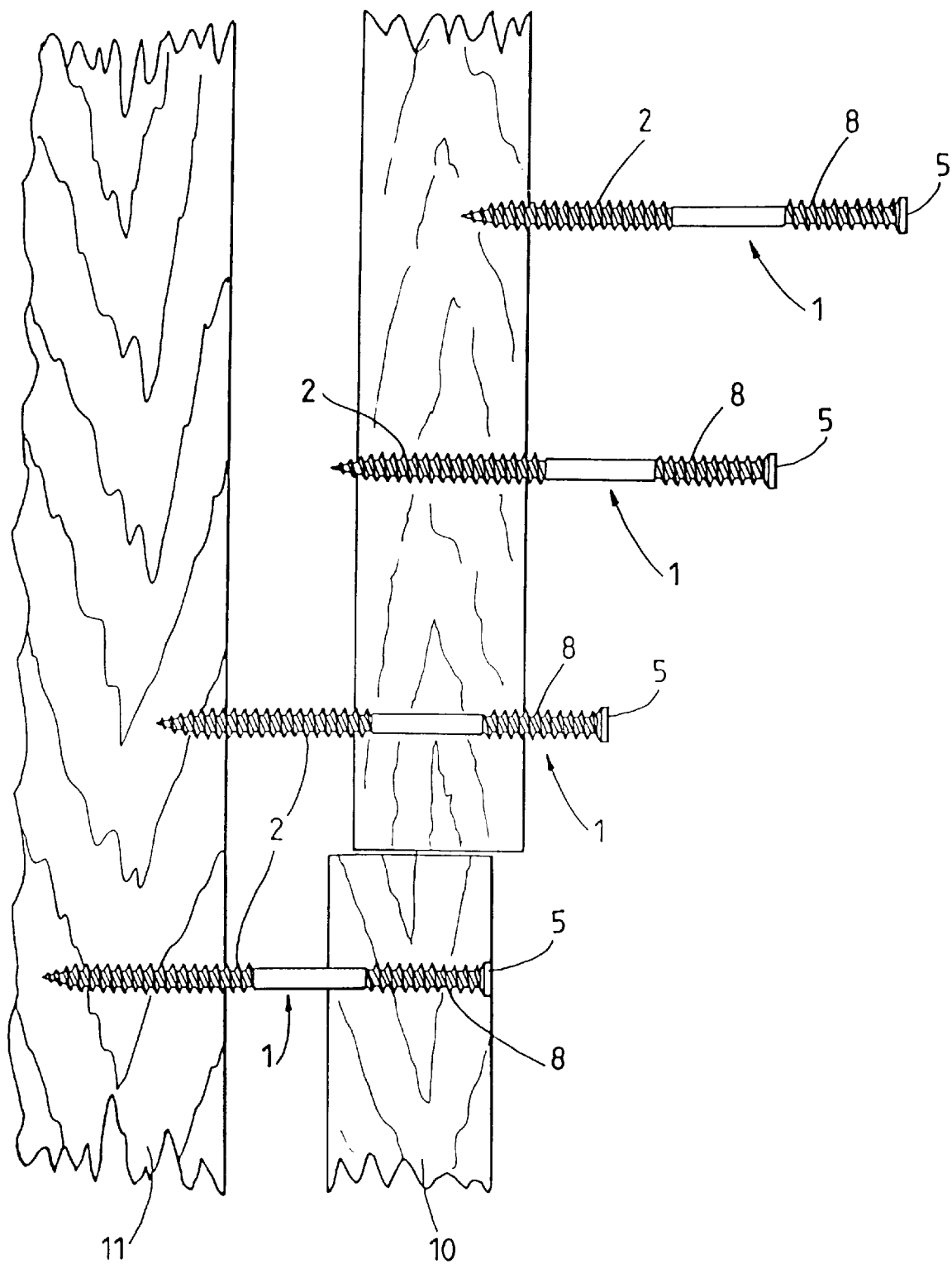
FIG. 3 shows the use of the spacer screw, shown in FIGS. 1 and 2, for fastening a wooden lath to a base member likewise consisting of wood.

The spacer screw shown in FIGS. 1 and 2 and denoted as a whole by 1 has a point region with a thread section 2, a shank section 3, which follows the thread section 2, and a head section 4. The latter is provided at the end with a screw head which in turn has a recess 6 for insertion of a tool.

The head section 4 furthermore has an anchoring section 7. This is intended for insertion into the structural member to be fastened to the base member and is formed essentially by a thread 8 which has not only the same core and external diameter but also the same pitch as a thread section 2 which can be screwed into the base member.

According to the invention, the thread 8 has an external thread diameter, which at most is equal to the external diameter d of the screw head 5, and a series of slits which is arranged along the screw axis and is formed by slit-like recesses 9 running transversely to the screw axis and interrupting the thread turn at constant distances. Said recesses can be produced, for example, by milling or rolling and, during screwing of the thread part 2 into the base member, serve in particular for permitting a movement of the anchoring section 7 relative to the structural member such that the distance between structural member and base member can be reduced on screwing in and can be increased in an analogous manner on unscrewing. As indicated in the embodiment shown, pairs of recesses 9 are bounded by two thread sections arranged perpendicularly to the screw axis. For the purposes of the invention, however, these sections, individually or in pairs, may also be inclined, i.e. at an acute or obtuse angle to the thread section 2, which may result in improved anchoring properties.

For fastening a wooden lath 10 to a wall 11 likewise consisting of wood, the front thread section 2 of the screw according to the invention is first screwed through the wooden lath 10. Said thread section is then fastened to the wooden wall 11. The thread 8 according to the invention is also screwed into the wooden lath 11, which, in contrast to the use of known screws, is effected without excessive force.

The process of screwing the thread 8 into the wooden lath 10 differs from the process of screwing the thread section 2 into the wooden wall 11. When the thread section 2 is screwed into the wooden wall 11 and when the thread 8 is screwed into the wooden lath 10, the slit-like recesses 9 do in fact generate a draw-in resistance, the force of drawing the thread 8 through the wooden lath 10 being reduced by the magnitude of said draw-in resistance. Because of this and because the screw head 5 has a diameter d which is at least equal to the external diameter of the thread 8, but is preferably greater than this, when the screw head 5 is completely sunk in the wooden lath 10 the distance between wooden lath 10 and wooden wall 11 can be reduced on screwing in and can be increased in an analogous manner on unscrewing.

A further essential advantage of the spacer screw according to the invention over the prior art disclosed in WO/97/26460 and that disclosed in EP-A 0 801 233 is that, when the spacer screw 1 is screwed in, the screw head 5 penetrates into the wooden lath 10 only until it comes to a stop with its largest circumference in this member, i.e. is not drawn through the lath 11 when the thread section 2 is further screwed into the wooden wall 11, which finally results in improved transverse stability of the fastened wooden lath 10.

It should be pointed out here that the spacer screw described with reference to FIGS. 1 to 3 represents only a selection from a plurality of possible embodiments of the invention and can be modified in various respects.

Thus, the length ratios of thread section 2, shank 3 and thread 8 can be chosen to be different, it also being possible of course to provide shank-free spacer screws.

With reference to WO/97/26460 and EP-A 0 801 233, it is furthermore possible to provide the thread section 2 and the anchoring section 7 with different external and/or core diameters and/or with different thread pitches.

Finally, depending on the material characteristics of the structural member, different spacer screws according to the invention can be provided, the recesses of which vary in number, shape, size and orientation. Thus, the recesses may, for example, also be arranged different distances apart and/or staggered relative to one another, for example arranged helically over the thread turn of the anchoring section, or they may differ in their depth and/or width ratios from the recesses 9 of the embodiment shown. Furthermore, the thread to be driven into the base member may also be formed in a different way and, for example, may have a thread head serving for screwing into masonry, so that wooden laths and the like can also be fastened to a concrete wall. However, the thread section which can be screwed into the base member can also be provided with a sawtooth-like thread turn, so that the spacer screws according to the invention can be screwed into a wooden wall without preliminary drilling.

What is claimed is:

1. A spacer screw for fastening a structural member to a base member, comprising a leading thread section to be received in the base member; a trailing anchoring section to be received in the structural member; a threadless shank section provided between the thread section and the anchoring section; and a head provided at an end of the anchoring section remote from the shank section, wherein the anchoring section has a thread provided with a plurality of thread-turn interrupting slit-like recesses, and an external diameter equal at most to an external diameter of the screw head.

2. The spacer screw as claimed in claim 1, wherein the external diameter of the screw head is greater than the external diameter of the thread.

3. The spacer screw as claimed in claim 1, wherein the thread section and the anchoring section have the same external diameter.

4. The spacer screw as claimed in claim 1, wherein the thread section and the anchoring section have the same core diameter.

5. The spacer screw as claimed in claim 1, wherein the thread section and the thread of the anchoring section have the same thread pitch.

6. A spacer screw for fastening a structural member to a base member, comprising a leading thread section to be received in the base member; a trailing anchoring section to be received in the structural member and spaced from the leading thread section; and a head provided at an end of the anchoring section remote from the thread section, wherein the anchoring section has a thread provided with a plurality of thread-turn interrupting slit-like recesses, and an external diameter equal at most to an external diameter of the screw head, and wherein the thread-turn interrupting slit-like recesses of the anchoring section thread are arranged at different distances apart or staggered relative to each other.

7. A spacer screw for fastening a structural member to a base member, comprising a leading thread section to be received in the base member; a trailing anchoring section to be received in the structural member and spaced from the leading thread section; and a head provided at an end of the anchoring section remote from the thread section, wherein the anchoring section has a thread provided with a plurality of thread-turn interrupting slit-like recesses, and an external diameter equal at most to an external diameter of the screw head, and wherein the thread-turn interrupting slit-like recesses of the anchoring section thread are arranged transversely or obliquely to a screw axis.

8. A spacer screw for fastening a structural member to a base member, comprising a leading thread section to be received in the base member; a trailing anchoring section to be received in the structural member and spaced from the leading thread section; a head provided at an end of the anchoring section remote from the thread section, wherein the anchoring section has a thread provided with a plurality of thread-turn interrupting slit-like recesses, and an external diameter equal at most to an external diameter of the screw head, and wherein the thread turn-interrupting slit-like recesses of the anchoring section thread are arranged along a screw axis transversely thereto and interrupt the thread turn at constant distances from each other.

9. A spacer screw for fastening a structural member to the base member, comprising a leading thread section to be received in the base member; a trailing anchoring section to be received in the structural member and spaced from the leading thread section; and a head provided at an end of the anchoring section remote from the thread section, wherein the anchoring section has a thread provided with a plurality of thread-turn interrupting slit-like recesses, and an external diameter equal at most to an external diameter of the screw head, and wherein the anchoring section thread has a different thread pitch than the leading thread section.

* * * * *